July 12, 1960  A. A. WALLUM  2,944,619
AUTOMATIC STEERING CONTROL FOR GARDEN TRACTORS OR THE LIKE
Filed Sept. 12, 1958  2 Sheets-Sheet 1
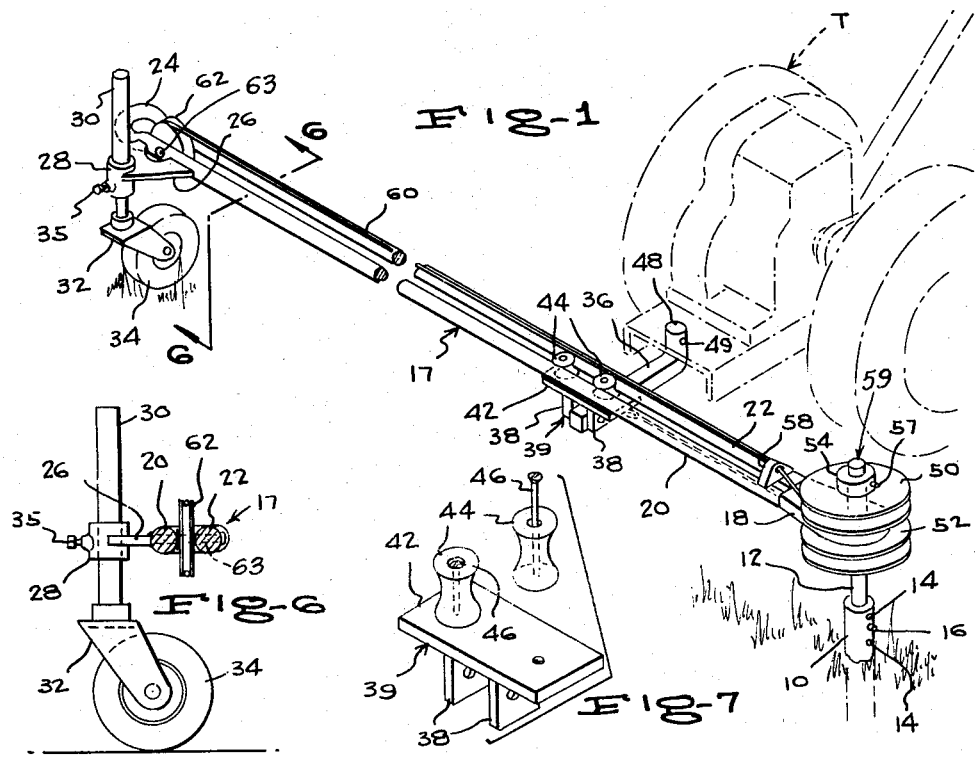
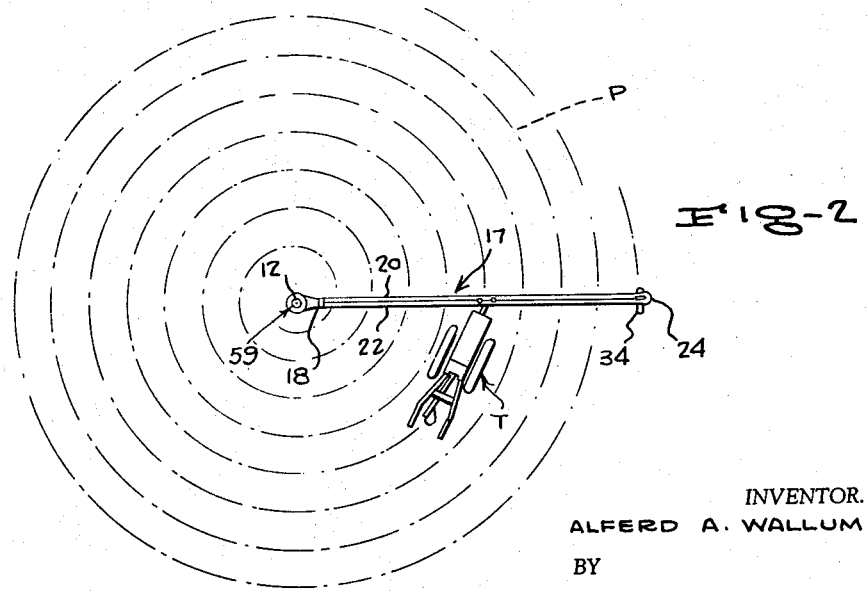
INVENTOR.
ALFERD A. WALLUM
BY
McMorrow, Berman + Davidson
ATTORNEYS July 12, 1960      A. A. WALLUM      2,944,619
AUTOMATIC STEERING CONTROL FOR GARDEN TRACTORS OR THE LIKE
Filed Sept. 12, 1958      2 Sheets-Sheet 2
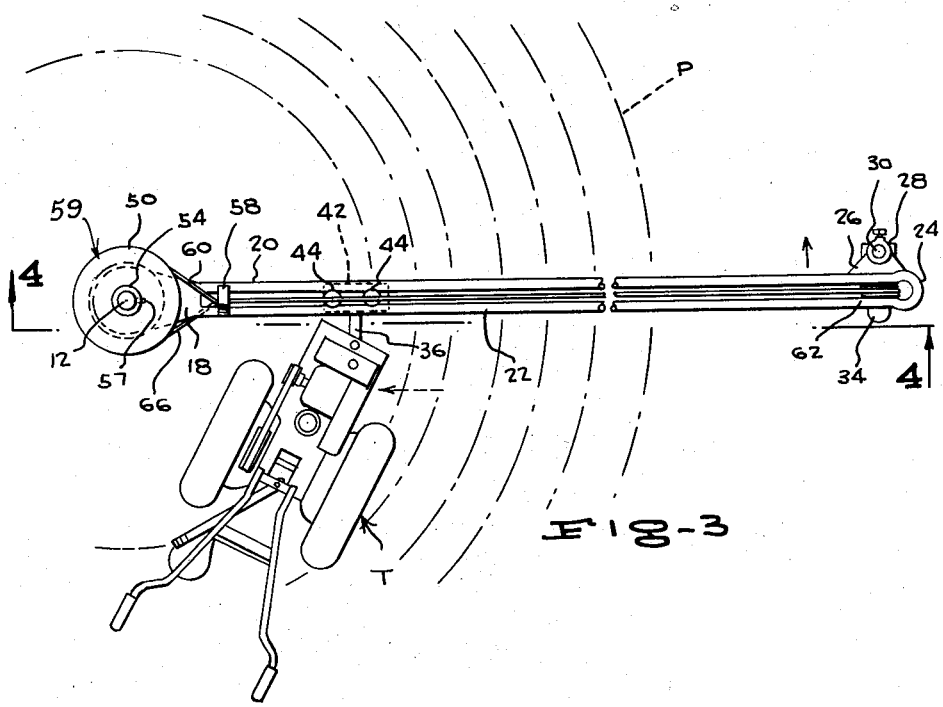
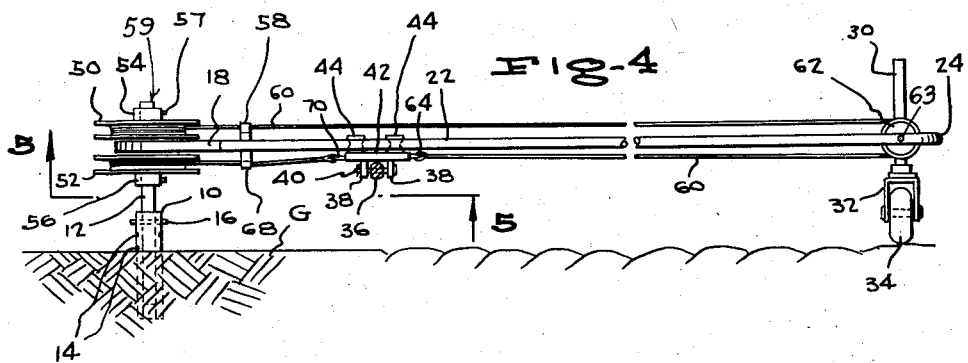
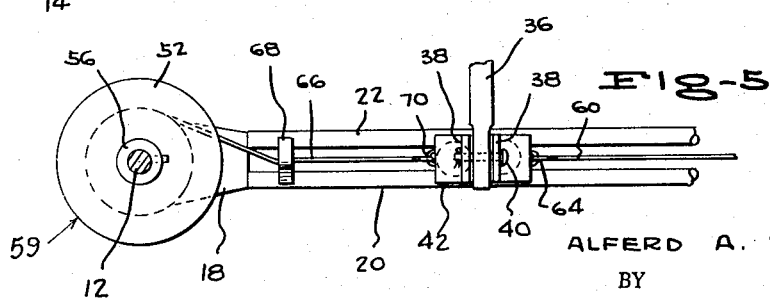
INVENTOR.
ALFERD A. WALLUM

United States Patent Office
2,944,619
Patented July 12, 1960

2,944,619

AUTOMATIC STEERING CONTROL FOR GARDEN TRACTORS OR THE LIKE

Alferd A. Wallum, De Smet, S. Dak.

Filed Sept. 12, 1958, Ser. No. 760,758

9 Claims. (Cl. 180—79)

Garden tractors and other self-propelled, relatively light agricultural machines are finding increasing favor. Machines of this type are important aids in gardening operations, such as those conducted on relatively small plots of land, by the ordinary householder, in contradistinction to large scale commercial operations carried on on full-sized farms. Further, gardening is becoming an increasingly popular outdoor activity, and many garden clubs are being regularly formed, which clubs often purchase equipment such as garden tractors. A garden tractor, of course, is designed for use at various stages during the season, and may initially be employed for plowing the garden, after which the tractor can be used in planting, fertilizing, cultivating, etc.

On each occasion of use of the garden tractor, however, the user is put to considerable work, since the tractor must be guided over the entire area that is under cultivation. Even though equipment of this type is relatively light as compared to full-size tractors, nevertheless operation of the same is somewhat fatiguing, particularly since such equipment is usually of the walking rather than the riding type.

In view of the above, it is proposed to provide an automatic control for garden tractors, which will be so designed as to cause the tractor to condition a large area, while left unattended. In other words, the tractor is placed in operation and is connected, while in operation, to a device formed according to the present invention, in such a way that as the tractor operates, it will travel through a spiraling path either toward or away from a predetermined center.

Summarized briefly, the present invention includes an elongated boom extending radially outwardly from a center post, said boom at its inner end being rotatably connected to the center post, which is anchored so as to be completely stationary. The boom is in the form of a trackway in which a roller assembly may move, said roller assembly being part of a carriage that travels longitudinally of the boom toward either the outer or the inner end of the boom. The carriage is connected to the garden tractor, and a pair of pulleys are fixed to the center post, with a cable being trained in opposite directions about the respective pulleys and extending to a pulley provided at the outer end of the boom. Means is provided, supporting the outer end of the boom for rotation about the post. By reason of this arrangement, when the tractor is placed in operation, it causes the boom to travel about the post, and this in turn causes the cable to be wound upon one of the stationary pulleys and un- wound from the other, to effect movement of the carriage either toward the outer or the inner end of the boom.

The invention, further, includes means for adjusting the height of the boom from the ground surface, to accommodate the same to the particular tractor, or to permit the attachment of various cultivating implements, etc.

One object of importance is to provide a device of the character stated which will be particularly efficient in operation for its intended purpose.

Another object is to provide a device of the character stated which will be connectable to a conventional garden tractor or similar agricultural machine, without requiring modification or redesign of said machine, except perhaps to a very inconsequential extent.

Still another object is to provide improved means for adjusting the height of the boom from the ground.

A further object of importance is to provide a highly simplified means for causing the tractor to travel longitudinally of the boom to effect the spiraling movement of the tractor as it travels about the center post.

Another object is to provide a device as stated which will be designed to allow conditioning of a large area of the ground surface while the garden tractor is left completely unattended.

Other objects will appear from the following description, the claims appended thereto, and from the annexed drawings, in which like reference characters designate like parts throughout the several views, and wherein:

Figure 1 is a perspective view of a tractor control device according to the present invention, a portion being broken away, a conventional garden tractor being shown in dotted lines operatively connected to the device;

Figure 2 is a reduced top plan view of the device in operation, the dotted lines showing the path traversed by the tractor;

Figure 3 is a top plan view on approximately the same scale as Figure 1, showing the device in use;

Figure 4 is a longitudinal sectional view on line 4—4 of Figure 3;

Figure 5 is a sectional view on an enlarged scale, taken on line 5—5 of Figure 4;

Figure 6 is a transverse section on an enlarged scale, taken on line 6—6 of Figure 1; and Figure 7 is a partially exploded, enlarged perspective view of the carriage per se.

Referring to the drawings in detail, designated at 10 is a vertically disposed, upwardly opening sleeve or socket, which is embedded in concrete or otherwise fixedly, permanently anchored in the ground surface. A post 12 has its lower end removably engaged in the socket. Formed in the socket is a vertically extending series of diametrically opposed openings 14, while the post 12 has a diametrically extending opening registrable with any of the openings 14. A pin 16 is extendable through the registered openings of the post 12 and socket 10. This permits vertical adjustment of the post within the sleeve or socket and causes the post to be secured against rotation in each selected position of vertical adjustment thereof.

A boom has been generally designated 17, and at its inner end includes a flat, wide inner end plate 18, which is progressively widened in a direction toward the post 12 and which lies in a plane perpendicular to the length of the post. Plate 18 is rounded at its wider end, and is formed with an opening receiving the post 12 with plate 18 being rotatable upon the stationary center post.

Fixedly secured to the smaller, outer end of the plate 18 are elongated, closely spaced rails 20, 22 respectively, the outer ends of which are fixedly connected by an arcuate connecting or bight portion 24. Adjacent the connecting portion 24, there is provided a wheel hanger support plate 26, rigidly secured to rail 20 and projecting laterally outwardly from said rail 20. Plate 26 is of approximately triangular formation, and at its outer end is fixedly secured to a vertically disposed, short sleeve or hanger 28, through which extends a standard 30 to the lower end of which is connected a swiveled yoke 32 of a caster wheel 34. A set screw 35 threaded in sleeve 28 bears against the standard, in selected positions to which the standard is vertically adjusted within the sleeve.

Designated at 36 is a draw bar that is relatively short in length. Draw bar 36 has a leading end extended between depending ears 38 of a carriage or trolley assembly generally designated 39. A pin 40 (Figure 5) extends through transversely aligned openings of the draw bar and of the ears 38, to connect the draw bar to the ears with the draw bar being free to pivot in a vertical plane perpendicular to the length of the boom.

Ears 38 extend downwardly from and are fixedly connected to the underside of a rectangular support plate 42 of the carriage. This underlies rails 20, 22. Extending upwardly from plate 42 are vertically disposed, pheripherally grooved guide rollers 44, that are freely rotatable upon vertically extending pins or axles 46 fixedly secured to and projecting upwardly from plate 42.

The rollers 44 extend between the rails 20, 22. The peripheral grooves of the rollers are adapted to receive the adjacent inner surfaces of the rails, as shown to best advantage in Figure 1. In actuality, the rollers need not turn in a single direction, it being mainly important that the rollers be free to travel longitudinally of the boom, with minimum friction between the rollers and the respective rails, with the rollers at the same time being designed to suspend the plate 42 from the rails.

At its trailing end, draw bar 36 has an upwardly projecting extension 48, extendable through an opening formed in the base plate or housing of a conventional garden tractor T. A connecting pin 49 is projected through the extension 48 to hold the same connected to the tractor. The tractor is adapted to pivot about the extension 48, that is, the tractor may turn about an axis perpendicularly intersecting the longitudinal center line of the horizontally extending main portion of the draw bar 36.

Above and below the plate 18 are horizontally disposed, large diameter, peripherally grooved discs or pulleys 50, 52 respectively, formed with hubs 54, 56 that are provided with set screws 57, whereby said hubs are adapted to be fixedly secured to the stationary post 12 in their assigned positions adjacent the plate 18. The socket 10, post 12, and discs 50, 52 together define a stationary center post assembly generally designated 59. A cable guide 58 is secured to the inner ends of the rails 20, 22 in position extending transversely of said rails as shown in Figures 1 and 3. Cable guide 58 has a center opening, receiving a cable 60. Cable 60 at one end is secured to the upper disc 50, the cable extending from the disc 50 at one side of said disc 50 to the guide 58. Then, the cable extends longitudinally of the boom above the rails 20, 22, to the outer ends of the boom. Here the cable is trained about a sheave 62 which rotates upon a pin 63 that extends transversely between the rails 20, 22 so that the sheave rotates about a horizontal, transverse axis perpendicularly intersecting the lengths of the boom rails 20, 22.

Cable 60, after being trained about the pulley 62, extends longitudinally of the boom below the rails 20, 22 as shown in Figure 4. Cable 60 is then connected at 64 to one end of the carriage plate 42.

A second cable 66 is connected to the other end of the carriage plate, and extends through a bottom guide 68 secured to the boom rails directly below the upper guide 58 (see Figure 4). The cable 66, after being extended through the guide 68, is wound upon the lower disc 52. It is important to note that the cable 66 extends to the side of the disc 52 opposite the side of disc 50 from which cable 60 extends, that is, the cables 60, 66 are extended from opposite sides of their respective pulleys. This may be noted to particular advantage from Figure 3.

By reason of the construction illustrated and described, it will be apparent that if the tractor is placed in operation, in, for example, the position shown in Figure 3, with the carriage disposed at the inner end of the boom, the forward movement of the tractor will cause the boom to travel counterclockwise about the center post 12, viewing the same as in Figure 3. As the boom travels in this direction, it will be apparent that the cable 66 will be wound upon the lower disc 52. Simultaneously, the cable 60 will be unwound from the upper disc 50. Therefore, cable 66 sets up a pull upon the carriage plate 42, tending to move the same radially inwardly of the axis about which the boom turns. This would cause the carriage to travel slowly toward the post 12, as the boom turns about the post responsive to forward movement of the tractor. Therefore, the tractor describes a spiraling path, the convolutions of which become increasingly smaller, so that the tractor travels from the outer end of the boom to the inner end of the boom, while moving in a spiraling path about the axis of rotation, said path being designated at P and being shown in Figure 2.

If the tractor is to describe a spiraling path radiating from the center, that is, if the tractor is to start near the center and travel outwardly, it would be disposed at the opposite side of the boom from the position shown in Figure 3. Then, when the tractor is placed in operation, the boom would be caused to travel clockwise in Figure 3. The result would be that the cable 60 would be wound upon disc 50, while cable 66 would be unwound from disc 52. Of course, this would cause the cable 60 to exert a pull upon the carriage plate 42, tending to shift the carriage plate toward the outer end of the boom.

It will be apparent that the device is placed in use whenever the tractor is to be operated in a circular plot. In this way, the device can be used for plowing said plot. Thereafter, the device might be employed for planting, cultivating, fertilizing, etc. and might even be employed should the tractor be equipped with harvesting implements or, after the harvest, with implements for mulching under the plant stock.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construciton that may be permitted within the scope of the appended claims.

What is claimed is:

1. An automatic control for a ground-working machine, comprising a center post; boom means extending radially from and having an inner end rotatably connected to the center post; a carriage movably supported upon and adapted to travel longitudinally of the boom means; means for connecting a ground-working machine to the carriage so as to cause the boom means to turn about the post responsive to forward movement of the machine; and means connected to the carriage and extending longitudinally of the boom means operative to effect longitudinal movement of the carriage responsive to turning of the boom means about the carriage, whereby said machine will travel through a spiral path about the post.

2. An automatic control for a ground-working machine comprising an upwardly opening, stationary socket adapted to be embedded in the ground surface; a center post connectible fixedly to the socket in selected positions of adjustment vertically of the socket; boom means extending radially from and having an inner end rotatably connected to the center post; a carriage movably supported upon and adapted to travel longitudinally of the boom means; means for connecting a ground-working machine to the carriage so as to cause the boom means to turn about the post responsive to forward movement of the machine; and means connected to the carriage and extending longitudinally of the boom means operative to effect longitudinal movement of the carriage responsive to turning of the boom means about the carriage, whereby said machine will travel through a spiral path about the post.

3. An automatic control for a ground-working machine comprising a stationary center post; boom means extending radially from and having an inner end rotatably connected to the center post; a carriage movably supported upon and adapted to travel longitudinally of the boom means; means for connecting a ground-working machine to the carriage so as to cause the boom means to turn about the post responsive to forward movement of the machine; a pair of discs fixedly connected to said center post; cable means wound in opposite directions about the respective discs and extending longitudinally of the boom means, said boom means including an idler sheave at the outer end thereof about which the cable means is trained, said cable means being connected to the carriage, whereby said machine will travel through a spiraling path responsive to forward motion thereof, with the cable means being wound upon one of the discs and being unwound from the other disc.

4. An automatic control for a ground-working machine comprising a stationary center post; boom means extending radially from and having an inner end rotatably connected to the center post; a carriage movably supported upon and adapted to travel longitudinally of the boom means; means for connecting a ground-working machine to the carriage so as to cause the boom means to turn about the post responsive to forward movement of the machine; a pair of discs fixedly connected to said center post; cable means wound in opposite directions about the respective discs and extending longitudinally of the boom means, said boom means including an idler sheave at the outer end thereof about which the cable means is trained, said cable means being connected to the carriage, whereby said machine will travel through a spiraling path responsive to forward motion thereof, with the cable means being wound upon one of the discs and being unwound from the other disc, said boom means including a caster wheel at the outer end thereof.

5. An automatic control for a ground-working machine comprising a stationary center post; boom means extending radially from and having an inner end rotatably connected to the center post; a carriage movably supported upon and adapted to travel longitudinally of the boom means; means for connecting a ground-working machine to the carriage so as to cause the boom means to turn about the post responsive to forward movement of the machine; a pair of discs fixedly connected to said center post; cable means wound in opposite directions about the respective discs and extending longitudinally of the boom means, said boom means including an idler sheave at the outer end thereof about which the cable means is trained, said cable means being connected to the carriage, whereby said machine will travel through a spiraling path responsive to forward motion thereof, with the cable means being wound upon one of the discs and being unwound from the other disc, said boom means including a caster wheel at the outer end thereof, said caster wheel having a vertically disposed post adjustable in a vertical direction so as to provide for positioning of the outer end of the boom means at a selected elevation above the ground surface.

6. An automatic control for a ground-working machine comprising a stationary center post; boom means extending radially from and having an inner end rotatably connected to the center post; a carriage movably supported upon and adapted to travel longitudinally of the boom means; means for connecting a ground-working machine to the carriage so as to cause the boom means to turn about the post responsive to forward movement of the machine; a pair of discs fixedly connected to said center post; cable means wound in opposite directions about the respective discs and extending longitudinally of the boom means, said boom means including an idler sheave at the outer end thereof about which the cable means is trained, said cable means being connected to the carriage, whereby said machine will travel through a spiraling path responsive to forward motion thereof, with the cable means being wound upon one of the discs and being unwound from the other disc, said boom means including a caster wheel at the outer end thereof, said caster wheel having a vertically disposed post adjustable in a vertical direction so as to provide for positioning of the outer end of the boom means at a selected elevation above the ground surface, said discs being mounted upon the center post for vertical adjustment above and below the boom means, whereby the boom means will be confined between the discs and will be engaged thereby against displacement axially of the center post, in selected positions of vertical adjustment of the discs.

7. An automatic control for a ground-working machine comprising a stationary center post; boom means extending radially from and having an inner end rotatably connected to the center post; a carriage movably supported upon and adapted to travel longitudinally of the boom means; means for connecting a ground-working machine to the carriage so as to cause the boom means to turn about the post responsive to forward movement of the machine; a pair of discs fixedly connected to said center post; cable means wound in opposite directions about the respective discs and extending longitudinally of the boom means, said boom means including an idler sheave at the outer end thereof about which the cable means is trained, said cable means being connected to the carriage, whereby said machine will travel through a spiraling path responsive to forward motion thereof, with the cable means being wound upon one of the discs and being unwound from the other disc, said boom means including a caster wheel at the outer end thereof, said caster wheel having a vertically disposed post adjustable in a vertical direction so as to provide for positioning of the outer end of the boom means at a selected elevation above the ground surface, said discs being mounted upon the center post for vertical adjustment above and below the boom means, whereby the boom means will be confined between the discs and will be engaged thereby against displacement axially of the center post, in selected positions of vertical adjustment of the discs, said boom means including a pair of closely spaced rails fixedly connected in transversely spaced, parallel relation, said carriage including vertically extending, peripherally grooved rollers disposed between the rails in engagement therewith.

8. An automatic control for a ground-working machine comprising: a stationary center post assembly; boom means extending laterally from and rotatably connected to said assembly; cable means extending longitudinally of the boom means, said cable means being wound at one end in one direction and at its other end in an opposite direction about said assembly, said cable means being trained intermediate its ends about the boom means at a location spaced longitudinally of the boom means from said assembly; and means for connecting a ground-working machine to said cable means, whereby said machine will travel through a spiraling path responsive to forward motion thereof with the cable means becoming wound at one end about the post assembly and becoming unwound at its other end from said assembly.

9. An automatic control for a ground-working machine comprising: a stationary center post assembly; boom means extending laterally from and rotatably connected to said assembly; cable means anchored at least at one end to said post assembly, whereby to be wound about the post assembly when the boom means is rotated in one direction thereabout, and unwound from the assembly on rotation of the boom means in the opposite direction thereabout, said cable means being mounted upon the boom means for movement longitudinally thereof responsive to said winding and unwinding of the cable means; and means for connecting a ground-working machine to said cable means, whereby said machine will travel through a spiraling path about the post assembly responsive to forward motion of the machine.

References Cited in the file of this patent

UNITED STATES PATENTS

| | | |
|---|---|---|
| 1,427,664 | Washburn | Aug. 29, 1922 |
| 2,259,193 | Andrew | Oct. 14, 1941 |
| 2,796,944 | Clement | June 25, 1957 |
| 2,824,616 | Knight et al. | Feb. 25, 1958 |